3,251,817
VINYLIDENE CHLORIDE COPOLYMER COATING COMPOSITIONS
Harold G. Hahn, Midland, Mich., and Rodger J. Lapham, McFarland, Wis., assignors to The Dow Chemical Company, Midland, Mich., a corporation of Delaware
No Drawing. Filed Mar. 1, 1963, Ser. No. 262,204
4 Claims. (Cl. 260—87.7)

This invention relates to coating compositions and processes, and, more particularly, to improved self-anchoring coating compositions consisting essentially of copolymers of vinylidene chloride and acrylic acid.

The coating of essentially smooth base materials such as regenerated cellulose film and the like, with vinyl polymers and copolymers for the purpose of rendering such base materials moisture-resistant, and otherwise improving the properties thereof, is well known.

Because they are durable, flexible, strong, odorless, transparent, heat-sealable and inherently moisture-resistant, thin coatings of vinylidene chloride interpolymers containing at least about 80 weight percent of vinylidene chloride, particularly vinylidene chloride/acrylonitrile copolymers, recommend themselves for this purpose. Coatings of such vinylidene chloride interpolymers generally have excellent moistureproofness but their adhesion to the base film or other articles under high moisture conditions is very poor. In order to improve the adhesion, it is commonly necessary to first apply an anchoring subcoating and then a vinylidene chloride interpolymer coating; which represents a costly and time consuming step, and hence a commercial disadvantage.

An object of this invention is to provide moistureproof, heat-sealable, transparent coatings of a vinylidene chloride interpolymer, which interpolymer strongly adheres directly to essentially smooth base materials, such as regenerated cellulose film and the like, even when the coated base material is maintained in an atmosphere of high moisture content or in direct contact with water for a considerable period of time.

Another object is to provide an essentially smooth article having in direct contact therewith a well adhered moistureproof transparent coating of vinylidene chloride interpolymer.

Other and related objects will become evident from the following specification and claims.

The above and related objects are accomplished, according to the invention, by coating an essentially smooth base material, as further described herein, by any convenient coating technique, with a coating composition comprising, as the film-forming component, a copolymer consisting essentially of (1) between 85 and 90 weight percent vinylidene chloride and (2) between 15 and 10 weight percent of acrylic acid.

Copolymers having relatively lower percentages of vinylidene chloride and correspondingly, higher percentages of acrylic acid, as described herein, form coatings which are insufficiently moisture-resistant. Additionally, copolymers containing relatively higher proportions of vinylidene chloride, and correspondingly lesser amounts of acrylic acid, are characterized by reduced solubility in conventionally used organic solvents, and are difficulty heat-sealed and have decreased self-anchoring properties when cast in the form of films or coatings. Thus, the copolymers of the present invention desirably contain a relatively high percentage of vinylidene chloride combined with a polar comonomer, which copolymer can be used to form coatings having the desirable combination of excellent barrier and self-anchoring properties.

The copolymer composition range as defined above does not necessarily refer to the composition of a monomer mixture employed in the preparation of the copolymer. The copolymer employed in the practice of the present invention is a substantially homogeneous copolymer wherein the polymer molecules have substantially uniformly copolymerized therein vinylidene chloride in the proportion of 85 to 90 weight percent and acrylic acid at the proportion of 15 to 10 weight percent. Homogeneous copolymers generally are known in the art, and are prepared by a variety of methods. One method by which the vinylidene chloride interpolymers of the present invention are prepared is by the polymerization of a mixture of about 93 percent vinylidene chloride and about 7 percent acrylic acid to a polymer conversion of between about 70 and 80 percent. The resultant copolymer obtained contains from about 10 to 15 percent polymerized acrylic acid in the polymer molecule with the remainder of the polymer being vinylidene chloride.

The polymers in accordance with the invention have the characteristic of being crystalline when deposited from the solvent system. Crystalline vinylidene chloride polymers exhibit higher barrier characteristics than do those of equivalent compositions when deposited in such a manner that the coating is noncrystalline, crystallinity of the coating being determined on a relative basis by the measurement of the infrared absorption at various wave lengths. A particularly beneficial and advantageous measurement is made by comparing the absorption intensity minimum at a wave length of about 955 millimicrons to that at about 930 millimicrons. The absorption at about 955 divided by the absorption at about 930 gives a ratio which is indicative of the crystalline nature of the copolymer. This ratio numerically does not vary widely from highly crystalline to medium crystalline but does vary widely between substantially crystalline to amorphous configurations, and thus serves as an adequate indication for most purposes. Thus, if the ratio is between 0.7 and 0.8 a polymer would be substantially amorphous. Whereas, if the ratio were as high as 1.10, the polymer would be highly crystalline.

Any sheet or film or other article susceptible to being coated with a vinylidene chloride copolymer may be used for the purposes of this invention. Because of its commercial importance however, regenerated cellulose film constitutes a preferred base material. Other suitable base materials are: films or sheets of polyethylene, polyethylene terephthalate, polyvinyl alcohol, casein, various polyamides such as polyhexamethylene adipamide among others; various cellulose esters such as cellulose acetate, cellulose nitrate, and cellulose acetate butyrate; polyvinyl acetals; vinyl combinations such as polyvinyl chloride/polyvinyl acetate copolymers; fibrous cellulosic materials such as tissue paper, book papers, crepe paper, wrapping paper, cardboard, chipboard, wallboard and the like; metals such as steel, aluminum, tin, among many others; wood products such as plywood; textiles such as cotton textiles and fabrics; other vegetable fiber products; and other substrata which are relatively insoluble in the coating solutions of the present invention. On the other hand, the coating systems of the present invention can also be used to cast unsupported films of the vinylidene chloride copolymer disclosed herein.

The monomer may be copolymerized by any known method to form the copolymers useful for the present invention. However, it is preferred that the polymerization be conducted in an appropriate organic solvent medium containing a free radical initiator, for example, azobisisobutyronitrile. Alternatively, the copolymer may be conveniently prepared by polymerization of the monomeric component in bulk without added diluent. The monomers may also be reacted in aqueous emulsions or suspension containing a catalyst such as potassium persulfate or lauroyl peroxide, and any of the well-known emulsifiers and/or dispersing agents. Polymerization in an aqueous medium is generally not preferred however, due to the excessive solubility of the acrylic acid constituent in water.

There is no critical order of addition of the various components of the monomeric mixture to be polymerized. A convenient manner of carrying out the process is to mix the monomers in an appropriate organic solvent medium, for example, ethyl acetate, containing catalytic amounts of a free radical initiator such as azobisisobutyronitrile. The components of the monomeric mixture to be polymerized can also be conveniently mixed and subsequently added to the organic medium containing the free radical initiating material.

The lacquer or coating mixtures in accordance with the invention are readily prepared by dissolving the solid vinylidene chloride/acrylic acid copolymer in a suitable solvent such as tetrahydrofuran, by any of the conventional means, such as agitating a suspension of the polymer in the solvent.

The concentration of the copolymer in the solvent medium will vary with the particular casting or coating method employed and the characteristics of the specific copolymer used. Desirably the copolymer will comprise about 10 to 20 percent by weight of the total lacquer mixture although higher or lower compositions are utilized if advantageous.

The lacquers comprising vinylidene chloride/acrylic acid copolymers of the present invention are readily applied to shaped articles as defined herein by conventional means such as spraying, brushing, dipping, rolling and the like.

In another embodiment of the present invention, it has unexpectedly been found that the barrier properties of the herein defined vinylidene chloride copolymer coating compositions can be further improved (while retaining the desirable self-anchoring properties) by cross-linking at least a portion of the pendent carboxylic acid groups of the copolymer constituent, with up to stoichiometric amounts, based on the acrylic acid constituent of said copolymer, of an acid reactive polyfunctional agent. Although any polyfunctional compound which will react with the pendent carboxylic acid groups of the copolymer is useful for the purposes of the present invention, it has been found that difunctional cyclic epoxy materials having terminal epoxy groups are particularly suitable for increasing the barrier properties of such coating composition. As exemplary of such preferred materials are compounds represented by the general formula:

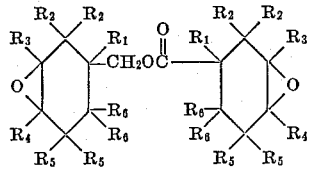

wherein $R_1$, $R_2$, $R_3$, $R_4$, $R_5$ and $R_6$ represent members selected from the group consisting of hydrogen and alkyl groups containing from 1 through 4 carbon atoms. Illustrative of such compounds are: 3,4-epoxycyclohexylmethyl 3,4-epoxycyclohexane carboxylate; 3,4-epoxy-1-methylcyclohexylmethyl 3,4-epoxycyclohexane carboxylate; 6-methyl-3,4-epoxycyclohexylmethyl 6-methyl-3,4-epoxycyclohexane carboxylate; 3,4-epoxy-(3 and/or 4)-methylcyclohexylmethyl 3,4-epoxy-(3 and/or 4)-methylcyclohexane carboxylate; 3,4-epoxy-(2 and/or 5)-methylcyclohexylmethyl 3,4-epoxy-(2 and/or 5)-methylcyclohexane carboxylate. These compounds may be prepared utilizing the procedures essentially as described in the U.S. Patent No. 2,890,209, issued June 9, 1959.

Illustrative of other difunctional materials which are suitable for the purposes of the present invention are: diisocyanates such as hexamethylene diisocyanate; glycols such as ethylene glycol; and diamines such as hexamethylene diamine.

Although the addition of such difunctional materials appears to progressively reduce the crystallinity ratio of the vinylidene chloride polymer, it has unexpectedly been observed that the barrier properties of coating compositions containing such materials are improved.

A further advantage of the herein described cross-linked vinylidene chloride/acrylic acid copolymer coating compositions resides in the ability of such difunctional materials to further react with functional groups such as oxides which may be present in the base material, thereby promoting the adhesion of such coatings to the base materials. Thus the self-anchoring properties of the vinylidene chloride/acrylic acid copolymer coating composition are retained and in some cases, may be enhanced.

When preparing the cross-linked copolymer coating compositions of the present invention, it has been found to be advantageous to dissolve the difunctional material, as defined herein, in the solvent phase of the coating composition prior to the addition of the copolymer constituent to such solvent.

Generally, it has been found to be most advantageous to utilize between about 3 and 7 weight percent of the difunctional material, as defined herein, based on the weight of the copolymer. The so-formed coating compositions have been found to provide the optimum desirable combination of barrier and self-anchoring properties when applied to base materials such as regenerated cellulose and the like.

The amounts of the polyfunctional cross-linking constituent of the coating composition may be varied up to stoichiometric amounts based on the acrylic acid constituent of the herein defined coating composition; depending on the composition of the substrate to which it is to be applied, as well as upon the degree of barrier protection, and self-anchoring properties desired.

The coating compositions of the invention may additionally suitably contain conventional dyes, pigments, light and heat stabilizers, and so forth, as necessary or desired for particular applications, without adversely affecting the desirable properties of the material.

The following examples, wherein all parts and percentages are to be taken by weight, illustrate the present invention but are not to be construed as limiting its scope.

Example I

In each of a series of experiments, individual monomeric mixtures of between about 95 and 93 parts by weight of vinylidene chloride and complementarily between 5 and 7 parts by weight of acrylic acid were polymerized in 30 parts by weight ethyl acetate containing 0.2 weight percent, based on the total weight of the mixture, of azobisisobutyronitrile. Each mixture was then individually reacted at a temperature of about 50° C. for a period of about 30 hours, until between 70 and 80 percent of the monomer mixture was converted to polymer. The non-polymerized components of the system were then decanted and evaporated at room temperature. The remaining copolymers containing (a) between 83 and 92 weight percent vinylidene chloride, and (b) a complementary amount of between 17 and 8 weight percent acrylic acid; were separately dissolved in tetrahydrofuran, at a temperature of about 25° C., in amounts sufficient to provide 20 percent by weight of the copolymer. Coatings of each of the lacquers were then separately cast onto individual sheets of regenerated cellulose film, and the coatings dried at a temperature of 125° C. for a period of about 5 minutes. Each of the coatings had a thickness of about 0.2 mil.

The following Table I, illustrates: the composition of the monomeric mixtures; the composition of the resulting copolymers; the moisture vapor transmission rate of each coated regenerated cellulose film (grams per 100 square inches per 24 hours as determined in a constant humidity cabinet at 100° F. and 90 to 95 percent relative humidity); and the self-anchoring properties of the coatings to the regenerated cellulose film. The self-anchoring properties were obtained by applying a fibrous tape about 0.75 inch wide and 6 inches long to both the coating and the regenerated cellulose film, after which the sheet was cut into strips corresponding to the dimensions of the taped area. The tape-covered strips of coated regenerated cellulose were then individually placed in the jaws of an Instrom Tensile Tester and peeled at a cross-head speed of 10 inches per minute, under a constant conditions of 65 percent relative humidity and a temperature of 22° C. The adhesion was measured as the number of grams of force required to peel the coating from the regenerated cellulose.

anchoring properties of such coating compositions when applied to regenerated cellulose. Comparative testing data for such non-modified copolymer coating is illustrated in the hereinbefore described Example I.

Example III

In each of a series of experiments, individual copolymers containing (a) between 89 and 90 weight percent vinylidene chloride and (b) a complementary amount of between 11 and 10 weight percent acrylic acid, were prepared utilizing the procedures as described in Example I. Each of the resulting copolymers was then individually dissolved in tetrahydrofuran at about 25° C., in amounts

TABLE I

| Run No. | Monomer Composition, Percent by weight | | Copolymer Composition, Percent by weight | | Moisture Vapor Transmission Rate | Force in Grams Required to Separate the Vinylidene Chloride Polymer Coating from the Regenerated Cellulose Film |
|---|---|---|---|---|---|---|
| | $VeCl_2$ | Acrylic Acid | $VeCl_2$ | Acrylic Acid | | |
| For Comparision: | | | | | | |
| 1 | 94.3 | 5.7 | 92 | 8 | | 70 |
| 2 | 91.4 | 8.6 | 84 | 16 | 0.34 | 260 |
| This Invention: | | | | | | |
| 3 | 93 | 7 | 90 | 10 | 0.14 | 200 |
| 4 | 93 | 7 | 89 | 11 | 0.16 | 235 |

The above data illustrates that vinylidene chloride/acrylic acid copolymer coating compositions containing from 10 to 11 weight percent acrylic acid combine the desirable properties of increased resistance to moisture and excellent self-anchoring properties. Similar good results are obtained with coatings of vinylidene chloride/acrylic acid copolymers containing from between 10 and 15 weight percent acrylic acid and correspondingly between 90 and 85 weight percent vinylidene chloride. For comparative purposes, the above data illustrates that similar copolymer coating compositions containing in excess of about 15 weight percent acrylic acid are characterized by markedly less resistance to moisture, as evidenced by a higher moisture vapor transmission rate, and, copolymer compositions containing less than 10 weight percent acrylic acid have significantly reduced self-anchoring properties.

In yet another comparison, a conventional regenerated cellulose coating comprising a copolymer containing 9 percent acrylonitrile, and 91 percent vinylidene chloride, was coated to an identical thickness on a similar piece of cellophane. The moisture vapor transmission rate was 0.30 gram per 100 square inches per 24 hours, and the force required to peel the coating from the cellulose film was 50 grams.

Example II

A coating solution was prepared by dissolving about 20 weight percent of a copolymer comprising (a) 89 weight percent vinylidene chloride and (b) 11 weight percent acrylic acid (as obtained using the procedures described in Example I) in tetrahydrofuran; said tetrahydrofuran having additionally dissolved therein, prior to mixing with the above described vinylidene chloride/acrylic acid copolymers, 5 grams of 6-methyl-3,4-epoxycyclohexylmethyl 6-methyl-3,4-epoxycyclohexane carboxylate. The so-formed lacquer solution was then cast onto a sheet of regenerated cellulose film and dried at a temperature of 125° C. for 15 minutes. The dried coatings had a thickness of about 0.2 mil; a moisture vapor resistance of 0.11; and required about 235 grams of force to separate the vinylidene chloride polymer coating from the regenerized cellulose film. Thus, the addition of minor amounts of the acid reactive difunctional material, as described herein, to the vinylidene chloride/acrylic acid coating composition of the present invention, effectively increased the barrier properties of the coating (as exemplified by the lower moisture vapor transmission rate of the modified coatings as compared to a similar non-modified copolymer coating composition), and retains the improved selfsufficient to form lacquer solutions containing 20 percent by weight of the copolymer. In some instances, the tetrahydrofuran additionally contained 5 weight percent of 6-methyl-3,4-epoxycyclohexylmethyl 6-methyl-3,4-epoxycyclohexane carboxylate prior to mixing with the above described film-forming vinylidene chloride/acrylic acid copolymer. Each of the so-formed lacquer solutions was then separately cast onto each of a series of steel, aluminum and tin plates utilizing a No. 10 wire wound rod, and dried at a temperature of 125° C. for between 5 and 15 minutes. Each of the dried coatings had a thickness of between about 0.05 and 0.1 mil. Each coated test sample was then immersed in a 60° C. water bath for 18 hours. All of the treated test samples were found to have adherent coatings thereon which were unaffected by the treatment in the water bath.

Example IV

In each of a series of experiments a copolymer containing (a) 89 weight percent vinylidene chloride and (b) a complementary amount of 11 weight percent acrylic acid, was prepared using the procedure as described in Example I. Each of the resulting copolymers was then indiivdually dissolved in tetrahydrofuran at about 25° C., in amounts sufficient to form lacquer solutions containing 20 percent by weight of the copolymer. In some instances, the tetrahydrofuran additionally contained 5 weight percent of 6-methyl-3,4-epoxycyclohexylmethyl 6-methyl-3,4-epoxycyclohexane carboxylate prior to mixing with the above described film-forming vinylidene chloride/acrylic acid copolymer. Each of the so-formed lacquer solutions was then separately cast onto each of a series of steel, aluminum, and tin plates, utilizing a No. 10 wire wound rod, and subsequently dried at a temperature of 125° C. for between 5 and 15 minutes. Each of the dried coatings had a thickness of between about 0.05 and 0.1 mil. Each coated test sample was then subjected to impact caused by the dropping of a one-pound steel ball, having a diameter of two inches, through a distance of 60 inches, onto the coated surface of each test sample. After impact, the self-anchoring property of each coating was separately determined by: severing the coating at the place of impact, applying cellophane tape to the edges of the severed area, and pulling off the cellophane tape. None of the coatings were removed with the tape, indicating excellent adhesion of both cross-linked and non-cross-linked coatings to the metal. Additionally, round disks were cold stamped from each of the coated tin and aluminum test samples, as a test of coating failure during cutting of such metal. There was no evidence of chipping, peeling, or fracture of any of the so-tested metal samples coated with the cross-linked or non-cross-linked coating compositions described herein.

Similar good results, as described herein, are attained when any base material, as described by the present invention, is coated with a composition having as a film-forming constitutent a copolymer of (1) between 85 and 90 weight percent vinylidene chloride and (2) between 15 and 10 weight percent of acrylic acid, with up to stoichiometric amounts based on the acrylic acid constituent of such composition, of at least one acid reactive polyfunctional material as described by the present invention.

What is claimed is:

1. A moisture-proof polymeric coating composition consisting essentially of:
   (1) An essentially homogeneous copolymer of between 85 and 90 weight percent vinylidene chloride and between 15 and 10 weight percent acrylic acid, and
   (2) between about 3 and 7 weight percent based on the weight of said copolymer of an acid reactive polyfunctional cross-linking agent having the formula:

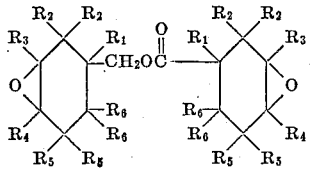

wherein $R_1$, $R_2$, $R_3$, $R_4$, $R_5$ and $R_6$ represent a member selected from the group consisting of hydrogen and alkyl having from 1 to 4 carbon atoms.

2. The composition of claim 1, wherein said reactive polyfunctional cross-linking agent is 6-methyl-3,4-epoxycyclohexylmethyl 6-methyl-3,4-epoxycyclohexane carboxylate.

3. A packaging film comprising a base film of regenerated cellulose having at least one surface coated with a composition consisting essentially of:

(1) An essentially homogenous copolymer of between 85 and 90 weight percent vinylidene chloride and between 15 and 10 weight percent acrylic acid, and
(2) between about 3 and 7 weight percent based on the weight of said copolymer of an acid reactive polyfunctional cross-linking agent having the formula:

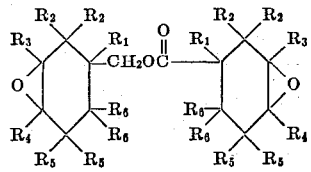

wherein $R_1$, $R_2$, $R_3$, $R_4$, $R_5$, and $R_6$ represent a member selected from the group consisting of hydrogen and alkyl having from 1 to 4 carbon atoms.

4. The packing film of claim 3, wherein said acid reactive polyfunctional crosslinking agent is 6-methyl-3,4-epoxycyclohexylmethyl 6-methyl-3,4-epoxycyclohexane carboxylate.

References Cited by the Examiner

UNITED STATES PATENTS

| | | | |
|---|---|---|---|
| 2,716,123 | 8/1955 | Frostick et al. | 260—348.5 |
| 2,802,801 | 8/1957 | Reid et al. | 260—30.4 |
| 2,819,984 | 1/1958 | Ackerman | 260—87.7 |
| 2,890,209 | 6/1959 | Phillips et al. | 260—348 |
| 3,031,434 | 4/1962 | Radlove | 260—348 |
| 3,080,341 | 3/1963 | Chenicek | 260—30.4 |
| 3,166,534 | 1/1965 | Perrins | 260—87.1 XR |

OTHER REFERENCES

Chemical and Engineering News, vol. 26, No. 23, June 7, 1948, p. 1688.

MORRIS LIEBMAN, *Primary Examiner.*

A. O. DENT, B. A. AMERNICK, *Assistant Examiners.*